US012586419B2

(12) United States Patent
Woo et al.

(10) Patent No.: US 12,586,419 B2
(45) Date of Patent: Mar. 24, 2026

(54) LOW QUALITY DEEPFAKE DETECTION DEVICE AND METHOD OF DETECTING LOW QUALITY DEEPFAKE USING THE SAME

(71) Applicant: RESEARCH & BUSINESS FOUNDATION SUNGKYUNKWAN UNIVERSITY, Suwon-si (KR)

(72) Inventors: Simon Sungil Woo, Suwon-si (KR); Sang Yup Lee, Suwon-si (KR); Jae Ju An, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 278 days.

(21) Appl. No.: 18/241,317

(22) Filed: Sep. 1, 2023

(65) Prior Publication Data

US 2024/0078845 A1 Mar. 7, 2024

(30) Foreign Application Priority Data

Sep. 1, 2022 (KR) ........................ 10-2022-0110652

(51) Int. Cl.
*G06V 40/40* (2022.01)
*G06T 3/4007* (2024.01)
(Continued)

(52) U.S. Cl.
CPC ............ *G06V 40/40* (2022.01); *G06T 3/4007* (2013.01); *G06T 3/4046* (2013.01); *G06T 3/4053* (2013.01)

(58) Field of Classification Search
CPC ...... G06V 40/40; G06V 10/82; G06V 10/761; G06T 3/4007; G06T 3/4046;
(Continued)

(56) References Cited

U.S. PATENT DOCUMENTS

2021/0209388 A1* 7/2021 Ciftci ..................... G06N 3/045

FOREIGN PATENT DOCUMENTS

JP 2001-333270 A 11/2001
JP 2009-530975 A 8/2009

OTHER PUBLICATIONS

A. S. Perera, A. S. Atukorale and P. Kumarasinghe, "Employing Super Resolution to Improve Low-Quality Deepfake Detection," 2022 22nd International Conference on Advances in ICT for Emerging Regions (ICTer), Colombo, Sri Lanka, 2022. (Year: 2022).*
(Continued)

*Primary Examiner* — Kathleen Y Dulaney

(57) ABSTRACT

A deepfake detection device may include a data input unit that receives an input image including a low-quality deepfake video, a branch-based super-resolution training unit that enhances the resolution of the input image through unsupervised super-resolution training and generates a plurality of super-resolution images having different sizes, and a multi-scale training unit that performs multi-scale training, without resolution conversion, on the plurality of super-resolution images having different sizes, respectively. The multi-scale training unit may synthesize multi-scale training results for the plurality of super-resolution images having different sizes, respectively, and determine whether the input image is a deepfake based on the multi-scale training results.

9 Claims, 7 Drawing Sheets

(51) Int. Cl.
  G06T 3/4046 (2024.01)
  G06T 3/4053 (2024.01)

(58) Field of Classification Search
  CPC ......... G06T 3/4053; G06T 2207/20084; G06T
              2207/30196; G06T 7/0002; G06T
                                   2207/20081
  USPC ............................ 382/100, 159, 181; 706/25
  See application file for complete search history.

(56)                    References Cited

OTHER PUBLICATIONS

U. A. Çiftçi and İ. Demir, "Deepfake Satellite Imagery Detection with Multi-Attention and Super Resolution," IGARSS 2023—2023 IEEE International Geoscience and Remote Sensing Symposium, Pasadena, CA, USA, 2023, pp. 4871-4874 (Year: 2023).*
N. S. Ivanov, A. V. Arzhskov and V. G. Ivanenko, "Combining Deep Learning and Super-Resolution Algorithms for Deep Fake Detection," 2020 IEEE Conference of Russian Young Researchers in Electrical and Electronic Engineering (ElConRus), St. Petersburg and Moscow, Russia, 2020, pp. 326-328. (Year: 2020).*
H. A. Khalil and S. A. Maged, "Deepfakes Creation and Detection Using Deep Learning," 2021 International Mobile, Intelligent, and Ubiquitous Computing Conference (MIUCC), Cairo, Egypt, 2021, pp. 1-4. (Year: 2021).*
X. Han, Z. Ji and W. Wang, "Low Resolution Facial Manipulation Detection," 2020 IEEE International Conference on Visual Communications and Image Processing (VCIP), Macau, China, 2020, pp. 431-434. (Year: 2020).*
DaeHee et al. "Deep Learning Based Fake Face Detection" *Journal of the Korea Industrial Information Systems Research* vol. 23 No. 5, Oct. 2018 (pp. 9-17).
Lee et al. "BZNet: Unsupervised Multi-scale Branch Zooming Network for Detecting Low-quality Deepfake Videos" *BZNet: Unsupervised Multi-scale Branch Zooming Network for Detecting Low-quality Deepfake Videos* Apr. 25-29, 2022 (pp. 3500-3510).

* cited by examiner

FIG. 5

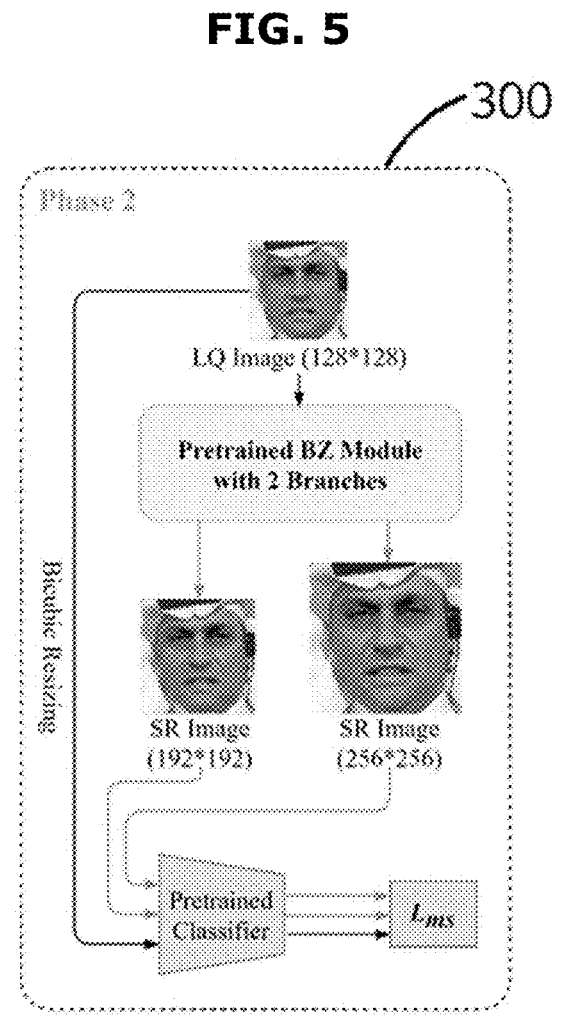

Phase 2

LQ Image (128*128)

Pretrained BZ Module
with 2 Branches

Bicubic Resizing

SR Image
(192*192)

SR Image
(256*256)

Pretrained
Classifier $L_{ms}$

300

LOW QUALITY DEEPFAKE DETECTION DEVICE AND METHOD OF DETECTING LOW QUALITY DEEPFAKE USING THE SAME

CROSS-REFERENCE TO RELATED APPLICATIONS

This application claims the priority benefit of Korean Patent Application No. 10-2022-0110652 filed on Sep. 1, 2022 in the Korean Intellectual Property Office, the disclosures of which are incorporated herein by reference.

BACKGROUND

1. Field

The present disclosure relates to a deepfake detection device, and more particularly, to a low-quality deepfake detection device based on a multi-scale branch zooming network algorithm capable of improving the performance of detecting low-quality deepfake videos, and a method of detecting a low-quality deepfake using the same.

2. Description of the Related Art

Deepfakes are very easy to be created due to being easily generated with an open source in recent years, and the damage is increasing due to synthesizing politicians or celebrities. Accordingly, deepfake detection techniques are also diversifying, and deepfake detection techniques actually exhibit high realism.

When a video is compressed to secure a storage space when a deepfake is distributed online, it is difficult to extract features that can distinguish the deepfake from the original before compression due to deterioration in image quality. In addition, low-quality deepfake video attacks exploiting these features becomes more difficult to detect.

Conventional deepfake video detection techniques exhibit high performance in a benchmark dataset detection experiment conducted in a specific experimental environment, but detection performance for deepfake videos with reduced quality due to compression is drastically lowered or has not been taken into consideration. That is, there exist vulnerabilities in conventional deepfake detection technologies that are weak against low-quality deepfake attacks.

Therefore, there is an urgent need to develop technologies capable of preventing the malicious use of deepfakes in advance through detecting low-quality deepfake videos that can target the public in the long term beyond politicians and celebrities with high accuracy.

(Patent Document 0001) Japanese Patent Application Laid-Open No. JP2009-530975A "Detecting Compositing in Previously Compressed Images"

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

An aspect of the present disclosure is to provide a deepfake detection device with improved detection performance for low-quality deepfake videos through utilizing an unsupervised branch-based super-resolution technique and a multi-scale deep learning model training method.

Another aspect of the present disclosure is to provide a deepfake detection device that can detect low-quality deepfake video attacks in advance and can quickly respond when a new type of deepfake video is distributed only in low quality.

However, the problem to be solved by the present disclosure is not limited to the above-mentioned problem, and may be expanded in various ways without departing from the concept and scope of the present disclosure.

In order achieve an aspect of the present disclosure, a deepfake detection device according to an embodiment of the present disclosure may include a data input unit that receives an input image including a low-quality deepfake video, a branch-based super-resolution training unit that enhances the resolution of the input image through unsupervised super-resolution training and generates a plurality of super-resolution images having different sizes, and a multi-scale training unit that performs multi-scale training, without resolution conversion, on the plurality of super-resolution images having different sizes, respectively. The multi-scale training unit may synthesize multi-scale training results for the plurality of super-resolution images having different sizes, respectively, and determine whether the input image is a deepfake based on the multi-scale training results.

In one embodiment, the branch-based super-resolution training unit may include a training guide unit that receives a guide image and generates the super-resolution image for the guide image, a training performance evaluation unit that compares the super-resolution image for the input image with the super-resolution image for the guide image to evaluate training performance for the input image, and a transfer training unit that compares the input image with the super-resolution image for the input image and performs transfer training on the super-resolution image.

In one embodiment, the training guide unit may compare the guide image with the super-resolution image for the guide image based on an $L_{id}$ loss function. The $L_{id}$ loss function may be defined as [Equation 1] below.

$$\mathcal{L}_{id} = \frac{1}{N}\sum_{i=1}^{N}\left\|\hat{x}_i^{hqsr} - x_i^{hq}\right\|^2 \qquad \text{[Equation 1]}$$

(Here, $\hat{x}_i^{hqsr}$ is a super-resolution image for a guide image, and i is a guide image.)

In one embodiment, the training performance evaluation unit may evaluate training performance for the input image based on an $L_{adv}$ loss function. The $L_{adv}$ loss function may be defined as [Equation 2] below.

$$\mathcal{L}_{adv} = \frac{1}{N}\sum_{i=1}^{N}\log\!\left(D\!\left(x_i^{hq}\right)\right) + \log\!\left(1 - D(\hat{x}_i^{sr})\right) \qquad \text{[Equation 2]}$$

(Here, $\hat{x}_i^{sr}$ is a super-resolution image for an input image, and $x_i^{hq}$ is a guide image.)

In one embodiment, the transfer training unit may perform transfer training on the super-resolution image based on an $L_{perc}$ loss function. The $L_{perc}$ loss function may be defined as $$\mathcal{L}_{perc} = \frac{1}{N} \sum_{i=1}^{N} \left\| VGG_{16}(\hat{x}_i^{sr}) - VGG_{16}(x_i^{bi}) \right\|^2 \qquad \text{[Equation 3]}$$

(Here, $\hat{x}_i^{sr}$ is a super-resolution image for an input image, and $x_i^{bi}$ is an image obtained by zooming in an input image using a bicubic interpolation technique.)

In one embodiment, the multi-scale training unit may include a global pooling layer and a classifier, and perform multi-scale training, without resolution conversion, on a plurality of super-resolution images having different sizes, respectively, based on the global pooling layer.

In one embodiment, the multi-scale training unit may receive a plurality of super-resolution images having different sizes at once in each training epoch, and perform multi-scale training, through back propagation, on the plurality of super-resolution images having different sizes, respectively.

In one embodiment, the multi-scale training unit may determine whether the input image is a deepfake based on an $L_{MS}$ loss function. The $L_{MS}$ loss function may be defined as [Equation 4] below.

$$\mathcal{L}_{MS} = \sum_{i=1}^{N} CE(x_i^{bi}, y) + \sum_{i=1}^{N} CE(\hat{x}_i^{sr}, y) \qquad \text{[Equation 4]}$$

(Here, CE is a cross entropy loss function for binary classification, $$x_i^{bi}$$

is an image obtained by zooming in an input image using a bicubic interpolation technique, $$\hat{x}_i^{sr}$$

is a super-resolution image for an input image, and y is a label to distinguish between a deepfake image and a real image.)

In order to achieve another aspect of the present disclosure, a method of detecting a deepfake according to embodiments of the present disclosure may include receiving an input image including a low-quality deepfake video, enhancing the resolution of the input image through unsupervised super-resolution training, generating a plurality of super-resolution images having different sizes, performing multi-scale training, without resolution conversion, on the plurality of super-resolution images having different sizes, respectively, synthesizing multi-scale training results for the plurality of super-resolution images having different sizes, respectively, and determining whether the input image is a deepfake based on the multi-scale training results.

A deepfake detection device of the present disclosure may extract various features of a deepfake image from a plurality of sizes of images and a plurality of resolutions of images through utilizing an unsupervised branch-based super-resolution technique and a multi-scale deep learning model training method.

Therefore, the deepfake detection device may improve detection performance for low-quality deepfake videos, block low-quality deepfake video attacks in advance, and rapidly respond when a new type of deepfake video is distributed only in low quality.

However, the effects of the present disclosure are not limited to the above-mentioned effects, and may be expanded in various ways without departing from the concept and scope of the present disclosure.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 5 is a diagram showing a training process of a multi-scale training unit.

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
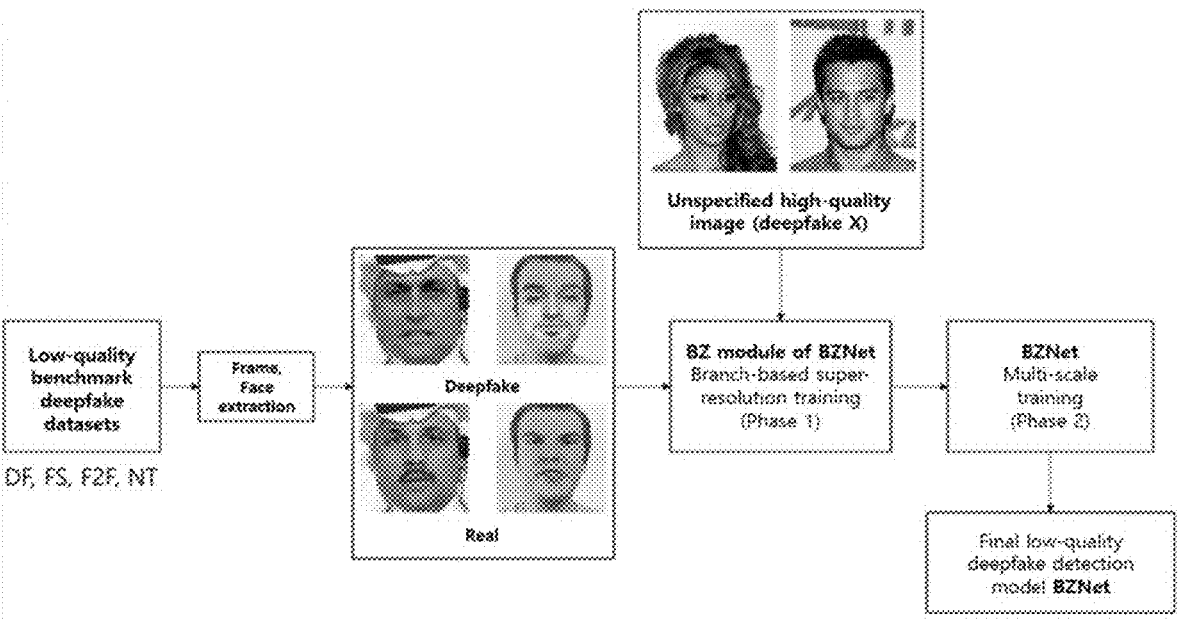
FIG. 1 is a conceptual diagram showing an operation of a deepfake detection device according to an embodiment of the present disclosure.

Specific structural or functional descriptions of embodiments according to the concept of the present disclosure disclosed herein are merely intended for the purpose of describing the embodiments according to the concept thereof, which may be implemented in various forms and are not limited to the embodiments described herein.

Various modifications may be made to the embodiments according to the concept of the present disclosure so as to have various forms, and thus the embodiments will be illustrated in the drawings and described in detail herein. However, it should be understood that the embodiments according to the concept of the present disclosure should not be intended to limit specific discloses forms thereof, and include all changes, equivalents or substitutes within the concept and the technical scope of the present disclosure.

Although terms of "first," "second," and the like are used to explain various components, the components are not limited to such terms. These terms are used only to distinguish one component from another component, and for example, a first component may be referred to as a second component, or similarly, the second component may be referred to as the first component within the scope of the present disclosure.

When it is mentioned that one component is "connected" or "coupled" to another component, it should be understood that the one component is directly connected or coupled to another component or that still another component is interposed between these two components. On the contrary, it should be understood that when it is mentioned herein that a component is "directly connected" or "directly coupled" to another component, a still another component may not be present therebetween. Likewise, expressions, for example, "between" and "immediately between" and "adjacent to" and "immediately adjacent to" may also be construed as described in the foregoing.

It should be noted that terms used herein are merely used to describe specific embodiments, but not to limit the present disclosure. As used herein, the singular forms are intended to include the plural forms as well, unless the context clearly indicates otherwise. It will be further understood that the terms "include" and/or "have", when used herein, specify the presence of stated features, integers, steps, operations, elements, components or a combination thereof, but do not preclude the presence or addition of one or more other features, integers, steps, operations, elements, components, and/or combinations thereof.

Unless defined otherwise, the terms used herein including technological or scientific terms have the same meaning that is generally understood by those ordinarily skilled in the art to which the invention pertains. The terms defined in a generally used dictionary should be understood to have meanings identical to those used in the context of the related art, and are not to be construed to have ideal or excessively formal meanings unless they are obviously defined herein.

Hereinafter, embodiments will be described in detail with reference to the accompanying drawings. However, the scope of the patent application is not limited or restricted by these embodiments. Like reference numerals in each drawing refer to like elements.

Figure 2:
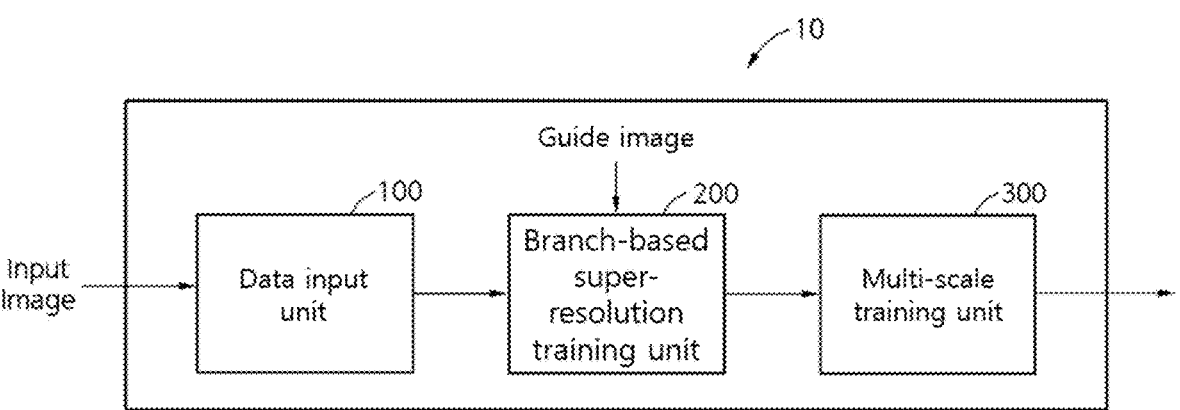
FIG. 2 is a block diagram showing a configuration of the deepfake detection device of FIG. 1.

FIG. 1 is a conceptual diagram showing an operation of a deepfake detection device 10 according to an embodiment of the present disclosure, and FIG. 2 is a block diagram showing a configuration of the deepfake detection device 10 of FIG. 1.

Referring to FIG. 1, the deepfake detection device 10 of the present disclosure may use an unsupervised branch-based super-resolution technique and a multi-scale deep learning model training method to enhance the performance of detecting low-quality deepfake videos.

For example, the deepfake detection device 10 may branch a low-quality deepfake video into multiple scales through an unsupervised deep learning-based super-resolution technique to enhance image quality, and train multi-scale images without resizing using a single deep-learning-based classifier.

To this end, as shown in FIG. 2, the deepfake detection device 10 may include a data input unit 100, a branch-based super-resolution training unit 200, and a multi-scale training unit 300.

The data input unit 100 may receive an input image including a low-quality deepfake video.

For example, the data input unit 100 may receive at least one of a DeepFake (DF) dataset, a FaceSwap (FS) dataset, a DeepFake Detection Challenge (DFDC) dataset, a Face2Face (F2F) dataset, a Neural Textures (NT) dataset, and a DeepFake in the Wild (DFW) dataset.

The branch-based super-resolution training unit 200 may enhance the resolution of the input image through unsupervised super-resolution training, and generate a plurality of super-resolution images having different sizes.

For example, the branch-based super-resolution training unit 200 may generate various sizes of super-resolution images, such as a 192*192 image, a 256*256 image, and a 512*512 image, based on the input image.

The multi-scale training unit 300 may perform multi-scale training, without resolution conversion, on the plurality of super-resolution images having different sizes, respectively.

In addition, the multi-scale training unit 300 may synthesize multi-scale training results for the plurality of super-resolution images having different sizes, respectively, and determine whether the input image is a deepfake based on the multi-scale training results.

As described above, the deepfake detection device 10 of the present disclosure may extract various features of a deepfake image from a plurality of sizes of images and a plurality of resolutions of images through utilizing an unsupervised branch-based super-resolution technique and a multi-scale deep learning model training method.

Therefore, the deepfake detection device 10 may improve detection performance for low-quality deepfake videos, block low-quality deepfake video attacks in advance, and rapidly respond when a new type of deepfake video is distributed only in low quality.

Hereinafter, specific configurations and operations of the branch-based super-resolution training unit 200 and the multi-scale training unit 300 will be described with reference to FIGS. 3 to 5.

Figure 3:
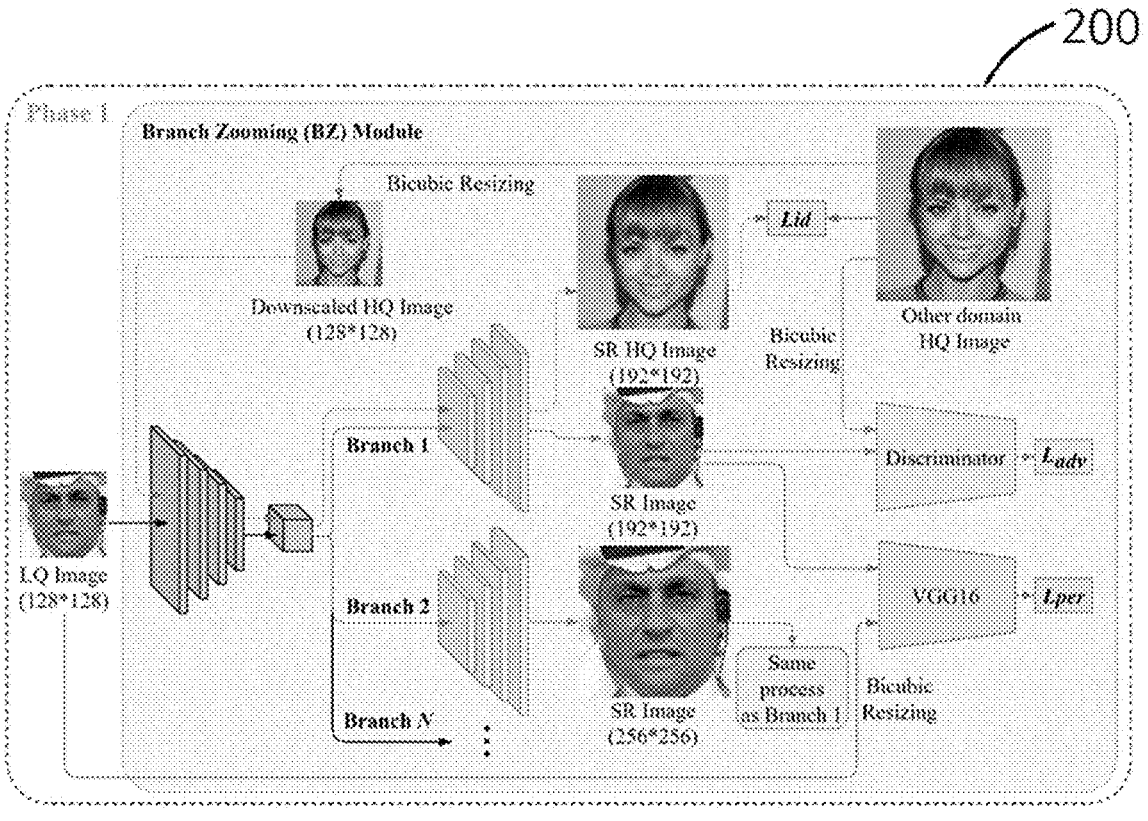
FIG. 3 is a diagram showing a training process of a branch-based super-resolution training unit.
Figure 4:
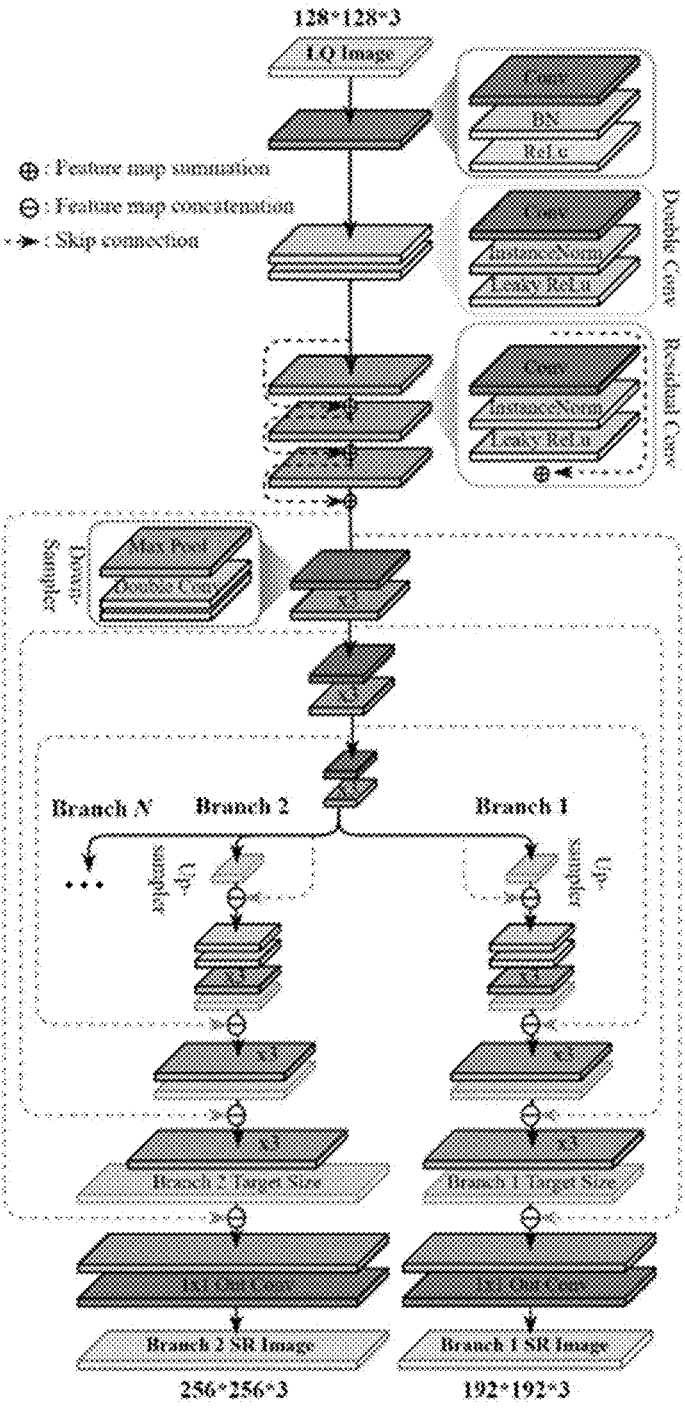
FIG. 4 is a diagram showing a network structure of a branch-based super-resolution training unit.

FIG. 3 is a diagram showing a training process of the branch-based super-resolution training unit 200, and FIG. 4 is a diagram showing a network structure of the branch-based super-resolution training unit 200.

Referring to FIGS. 3 and 4, the branch-based super-resolution training unit 200 may enhance the resolution of the input image through unsupervised super-resolution training, and generate a plurality of super-resolution images having different sizes.

The branch-based super-resolution training unit 200 may include a training guide unit, a training performance evaluation unit, and a transfer training unit.

The branch-based super-resolution training unit 200 may zoom in a low-quality deepfake image into various sizes of super-resolution images through a branch zooming (BZ) module using the training guide unit, the training performance evaluation unit, and the transfer training unit.

For example, the branch-based super-resolution training unit 200 may include one encoder and a multi-decoder (branches 1, 2, . . . , N). The multi-decoder may generate super-resolution images by zooming in an input image to pre-set different sizes of image resolutions.

As shown in FIG. 4, the branch-based super-resolution training unit 200 may include a convolutional layer, a double convolutional layer, a batch normalization layer, a Rectified Linear Unit (ReLU) layer, a ReLu layer with a small slope (Leaky Rectified Linear Unit layer), and an instance normalization layer.

The training guide unit may receive a guide image, and generate the super-resolution image for the guide image.

For example, the training guide unit may receive various high-quality guide images such as faces, objects, and animals, and forcibly convert the guide images into low-quality guide images.

The training guide unit may generate a super-resolution image for the forcibly converted low-quality guide image by utilizing the encoder and the multi-decoder.

The training guide unit may compare the forcibly converted low-quality guide image with the super-resolution image for the guide image.

For example, the training guide unit may compare the guide image with the super-resolution image for the guide image based on an $L_{id}$ loss function.

The $L_{id}$ loss function may be defined as [Equation 1] below.

$$\mathcal{L}_{id} = \frac{1}{N}\sum_{i=1}^{N}\left\|\hat{x}_i^{hqsr} - x_i^{hq}\right\|^2 \qquad \text{[Equation 1]}$$

Here, $$\hat{x}_i^{hqsr}$$

is a super-resolution image for a guide image, $$x_i^{hq}$$

is a guide image.

The training performance evaluation unit may compare the super-resolution image for the input image with the super-resolution image for the guide image to evaluate training performance for the input image.

For example, the training performance evaluation unit may generate a super-resolution image for an input image including a low-quality deepfake image by utilizing an encoder and a multi-decoder.

The training performance evaluation unit may input a super-resolution image for an input image and the guide image of a high-resolution original to a classifier deep learning model (discriminator).

Here, the classifier deep learning model (discriminator) plays a role of distinguishing whether a super-resolution image and a guide image for an input image are actual high-resolution images or super-resolution images.

In case the classifier deep learning model is unable to distinguish whether a super-resolution image for an input image is an actual high-resolution image or a super-resolution image, the performed training performance may be evaluated as excellent.

For example, the training performance evaluation unit may evaluate training performance for the input image based on an $L_{adv}$ loss function.

The $L_{adv}$ loss function may be defined as [Equation 2] below.

$$\mathcal{L}_{adv} = \frac{1}{N}\sum_{i=1}^{N}\log\left(D\left(x_i^{hq}\right)\right) + \log(1 - D(\hat{x}_i^{sr})) \qquad \text{[Equation 2]}$$

Here, $$\hat{x}_i^{sr}$$

is a super-resolution image for an input image, and $$x_i^{hq}$$

is a guide image.

The transfer training unit may compare the input image with the super-resolution image of the input image, and perform transfer training on the super-resolution image.

For example, the results of passing a super-resolution image for a super-input image generated by the decoder and an image obtained by zooming in an input image using a bicubic interpolation technique through a VGG16 model may be compared with each other.

The transfer training unit may perform transfer training on a super-resolution image, thereby maintaining the texture and context of the super-resolution image.

For example, the transfer training unit may perform transfer training on the super-resolution image based on an $L_{perc}$ loss function.

The $L_{perc}$ loss function may be defined as [Equation 3] below.

$$\mathcal{L}_{perc} = \frac{1}{N}\sum_{i=1}^{N}\left\|VGG_{16}(\hat{x}_i^{sr}) - VGG_{16}\left(x_i^{bi}\right)\right\|^2 \qquad \text{[Equation 3]}$$

Here, $$\hat{x}_i^{sr}$$

is a super-resolution image for an input image, and $$x_i^{bi}$$

is an image obtained by zooming in an input image using a bicubic interpolation technique.

The branch-based super-resolution training unit 200 may calculate a final loss function ($L_{BZ}$) based on the $L_{id}$ loss function, the $L_{adv}$ loss function, and the $L_{perc}$ loss function.

$$\mathcal{L}_{BZ} = \gamma_1\mathcal{L}_{adv} + \gamma_2\mathcal{L}_{id} + \gamma_3\mathcal{L}_{per} \qquad \text{[Equation]}$$

Here, $\gamma_1$, $\gamma_2$, and $\gamma_3$ are weights for the $L_{id}$ loss function, the $L_{adv}$ loss function, and the $L_{perc}$ loss function, respectively.

As a result, the branch-based super-resolution training unit 200 may set a size of each branch for the input image to obtain super-resolution images $$(\hat{x}_i^{sr})$$

for i branches with different resolutions.

FIG. 5 is a diagram showing a training process of the multi-scale training unit 300.

Referring to FIG. 5, the multi-scale training unit 300 may perform multi-scale training, without resolution conversion, on the plurality of super-resolution images having different sizes, respectively.

For example, the multi-scale training unit 300 may learn all multi-scale super-resolution images without fixing sizes of the super-resolution images being received.

The multi-scale training unit 300 may include a global pooling layer and a classifier.

The multi-scale training unit 300 may perform multi-scale training, without resolution conversion, on the plurality of super-resolution images having different sizes, respectively, based on the global pooling layer.

Even when different resolutions of images are input to the multi-scale training unit 300, since the global pooling layer always constructs the input data as vectors in the same dimension, the multi-scale training unit 300 may learn super-resolution images (e.g., 192*192 images, 256*256 images, 512*512 images, etc.) with different sizes and different resolutions as they are in a classification neural network.

For example, the multi-scale training unit 300 may receive a plurality of super-resolution images having different sizes at once in each learning step (epoch), and perform multi-scale training, through back propagation, on the plurality of super-resolution images having different sizes, respectively.

For example, the multi-scale training unit 300 may use a binary classifier such as Xception to classify deepfake images from non-deepfake real images.

In one embodiment, the multi-scale training unit 300 may determine whether the input image is a deepfake based on an $L_{MS}$ loss function. The $L_{MS}$ loss function may be defined as [Equation 4] below.

$$\mathcal{L}_{MS} = \sum_{i=1}^{N} CE(x_i^{bi}, y) + \sum_{i=1}^{N} CE(\hat{x}_i^{sr}, y) \qquad \text{[Equation 4]}$$

Here, CE is a cross entropy loss function for binary classification, $$x_i^{bi}$$

is an image obtained by zooming in an input image using a bicubic interpolation technique, $$\hat{x}_i^{sr}$$

is a super-resolution image for an input image, and y is a label to distinguish between a deepfake image and a real image.

Figure 6:
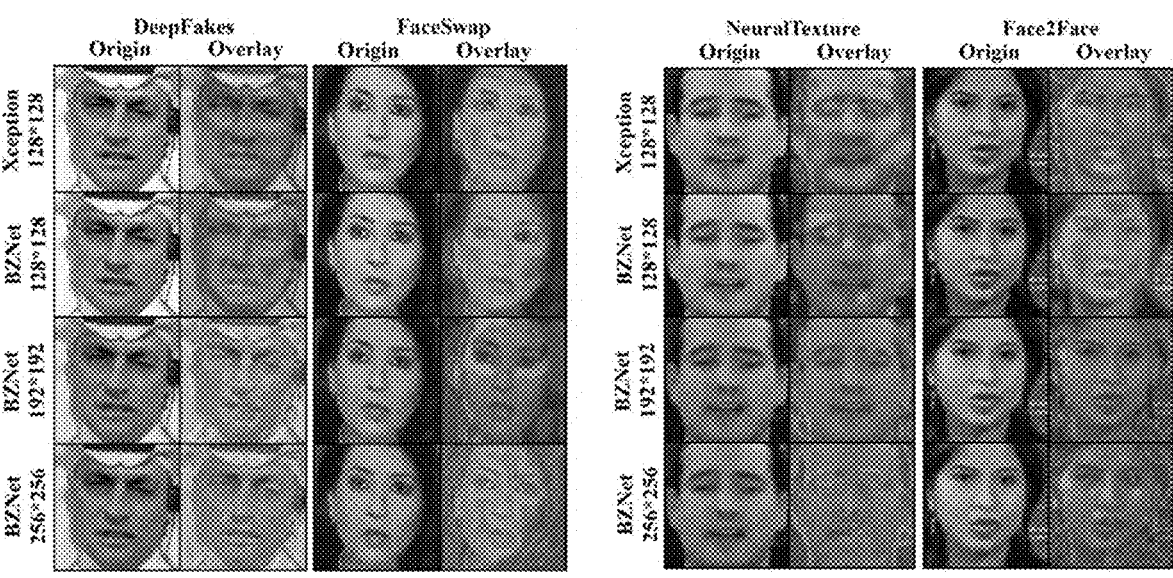
FIG. 6 is a diagram showing a degree of concentration for each image scale of the deepfake detection device when detecting a low-quality deepfake.

The multi-scale training unit 300 may synthesize multi-scale training results for the plurality of super-resolution images having different sizes, respectively, and determine whether the input image is a deepfake based on the multi-scale training results FIG. 6 is a diagram showing a degree of concentration for each image scale of the deepfake detection device 10 when detecting a low-quality deepfake.

Referring to FIG. 6, when detecting a low-quality deepfake, it is indicated which part of the image the deepfake detection device 10 concentrates on As shown in FIG. 6, it can be seen that the areas that the deepfake detection device 10 focuses on are different for each image size and resolution.

That is, the deepfake detection device 10 of the present disclosure may extract various features for deepfake videos from a plurality of sizes of images and a plurality of resolutions of images, thereby improving performance for detecting low-quality deepfake videos.

Figure 7:
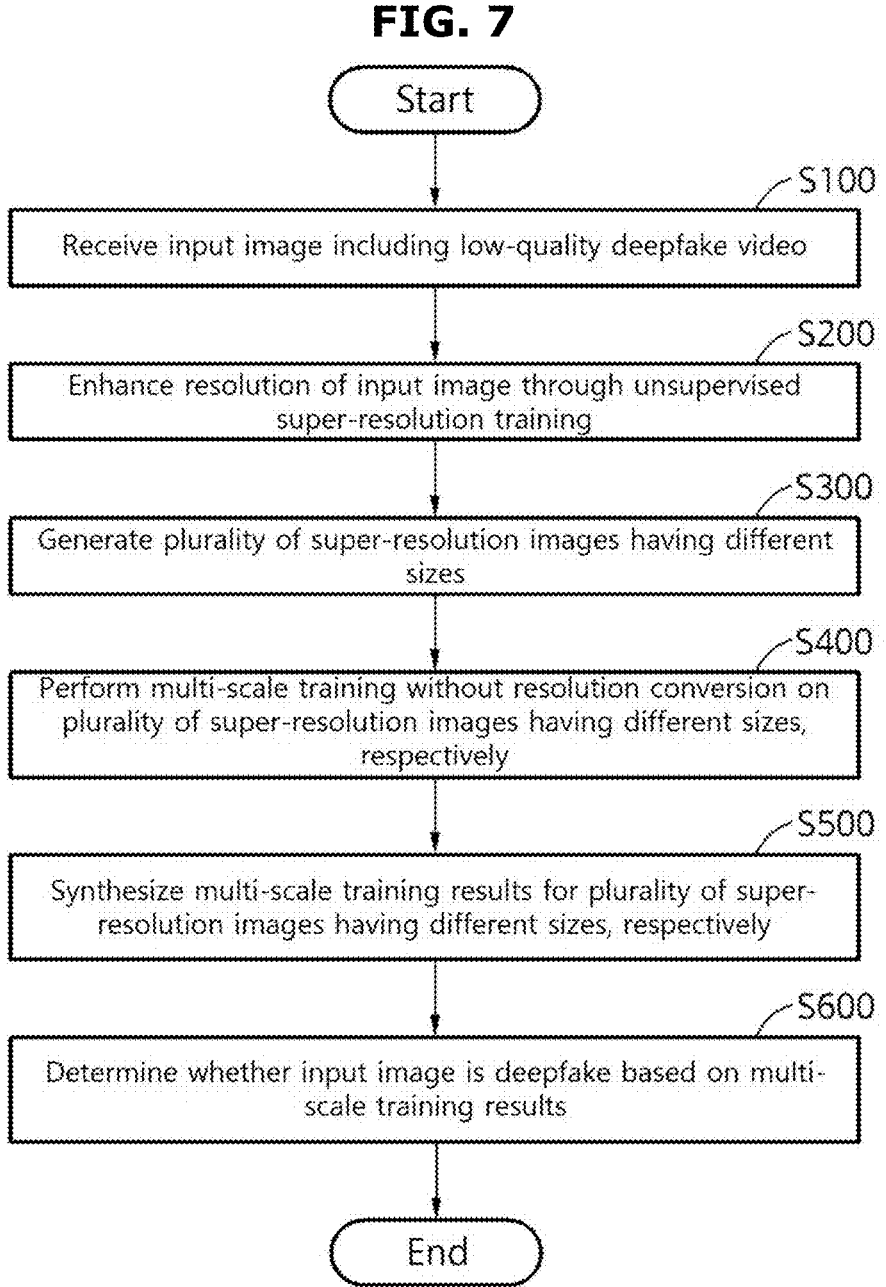
FIG. 7 is a flowchart showing a deepfake detection method according to embodiments of the present disclosure.

FIG. 7 is a flowchart showing a deepfake detection method according to embodiments of the present disclosure.

Referring to FIG. 7, in order to achieve another aspect of the present disclosure, a deepfake detection method according to embodiments of the present disclosure may include receiving an input image including a low-quality deepfake video (S100), enhancing the resolution of the input image through unsupervised super-resolution training (S200), generating a plurality of super-resolution images having different sizes (S300), performing multi-scale training, without resolution conversion, on the plurality of super-resolution images having different sizes, respectively (S400), synthesizing multi-scale training results for the plurality of super-resolution images having different sizes, respectively (S500), and determining whether the input image is a deepfake based on the multi-scale training results (S600).

As described above, the deepfake detection method of the present disclosure may extract various features of a deepfake image from a plurality of sizes of images and a plurality of resolutions of images through utilizing an unsupervised branch-based super-resolution technique and a multi-scale deep learning model training method.

Therefore, the deepfake detection method may improve detection performance for low-quality deepfake videos, block low-quality deepfake video attacks in advance, and rapidly respond when a new type of deepfake video is distributed only in low quality.

However, the details thereof have been described above, and thus a redundant description thereof will be omitted.

The device described above may be implemented as hardware components, software components, and/or a combination of hardware components and software components. For example, the devices and components described in the embodiments may be implemented using one or more general purpose or special purpose computers, such as, a processor, a controller, an arithmetic logic unit (ALU), a digital signal processor, a microcomputer, a field programmable array (FPA), a programmable logic unit (PLU), a microprocessor, or any other device capable of executing and responding to instructions. A processing device may run an operating system (OS) and one or more software applications running on the operating system. The processing device may also access, store, manipulate, process, and generate data in response to the execution of the software. For the convenience of understanding, in some case, it is described that only one processing device is used, but it will be appreciated for those skilled in the art to understand that the processing device includes a plurality of processing elements and/or a plurality of types of processing elements. For example, the processing device may include a plurality of processors or one processor and one controller. Furthermore, the processing device may include an additional processing configuration such as one including parallel processors.

The method according to the embodiments may be implemented in program instructions that can be executed through various types of computer means, and may be recorded in a computer-readable storage medium. The computer-readable recording medium may include program instructions, data files, data structures, and the like, alone or in combination thereof. The program instructions recorded in the medium may be designed and configured especially for the embodiments or may be known to and used by those skilled in computer software fields. Examples of the computer-readable recording medium include magnetic media such as hard disks, floppy disks, and magnetic tapes, optical media such as compact disk-read only memory (CD-ROM) and digital versatile disks (DVDs), magneto-optical media such as floptical disks, and hardware devices such as read-only memory (ROM), random access memory (RAM), and flash memory, which are specially configured to store and execute program instructions. Examples of the program instructions include not only machine language codes created by a compiler or the like, but also high-level language codes that can be executed by a computer using an interpreter or the like. The hardware devices may be configured to operate as one or more software modules in order to perform the operation of the embodiments, and vice versa.

As described above, though the embodiments have been described with limited drawings, those skilled in the art may make various modifications and variations from the above description. For example, although the above-described techniques are performed in a different order from that of the above-described method, and/or the above-described components, such as a system, a structure, a device, and circuit, are coupled or combined in a different form from that of the above-described method, or replaced or substituted with other components or equivalents, proper results may be achieved. Therefore, other implementations, other embodiments, and equivalents to the claims are within the scope of the following claims.

What is claimed is:

1. A deepfake detection device, the device comprising:
memory storing instructions; and
at least one processor,
wherein the instructions, when executed by the at least one processor, cause the device to
receive an input image including a low-quality deepfake video;
enhance the resolution of the input image through unsupervised super-resolution training and
generate a plurality of super-resolution images having different sizes; and
perform multi-scale training, without resolution conversion, on the plurality of super-resolution images having different sizes, respectively;
synthesize multi-scale training results for the plurality of super-resolution images having different sizes, respectively; and
determine whether the input image is a deepfake based on the multi-scale training results.

2. The device of claim 1, wherein the instructions, when executed by the at least one processor, further cause the device to:
receive a guide image and generate a super-resolution image for the guide image;
compare at least one of the plurality of super-resolution images generated for the input image with the super-resolution image for the guide image to evaluate training performance for the input image; and
compare the input image with the at least one of the plurality of super-resolution images generated for the input image and perform transfer training on the at least one of the plurality of super-resolution images.

3. The device of claim 2, wherein the instructions, when executed by the at least one processor, further cause the device to:
compare the guide image with the super-resolution image for the guide image based on a $L_{id}$ loss function, and
wherein the $L_{id}$ loss function is defined as [Equation 1] below;

$$\mathcal{L}_{id} = \frac{1}{N} \sum_{i=1}^{N} \left\| \hat{x}_i^{hqsr} - x_i^{hq} \right\|^2 \qquad \text{[Equation 1]}$$

(Here, N is the total number of branches i, $$\hat{x}_i^{hqsr}$$

is a super-resolution image for a guide image, and $$x_i^{hq}$$

is a guide image).

4. The device of claim 2, wherein the instructions, when executed by the at least one processor, further cause the device to:
evaluate training performance for the input image based on an $L_{adv}$ loss function, and
wherein the $L_{adv}$ loss function is defined as [Equation 2] below;

$$\mathcal{L}_{adv} = \frac{1}{N} \sum_{i=1}^{N} \log\left(D\left(x_i^{hq}\right)\right) + \log\left(1 - D\left(\hat{x}_i^{sr}\right)\right) \qquad \text{[Equation 2]}$$

(Here, N is the total number of branches i, D is a discriminator function, $$\hat{x}_i^{sr}$$

is the at least one of the plurality of super-resolution images generated for the input image, and $$x_i^{hq}$$

is a guide image).

5. The device of claim 2, wherein the instructions, when executed by the at least one processor, further cause the device to:
perform transfer training on the at least one of the plurality of super-resolution images based on an $L_{perc}$ loss function, and
wherein the $L_{perc}$ loss function is defined as [Equation 3] below;

$$\mathcal{L}_{perc} = \frac{1}{N} \sum_{i=1}^{N} \left\| VGG_{16}(\hat{x}_i^{sr}) - VGG_{16}\left(x_i^{bi}\right) \right\|^2 \qquad \text{[Equation 3]}$$

(Here, N is the total number of branches i, $VGG_{16}$ is a convolutional neural network model for feature extraction, $$\hat{x}_i^{sr}$$

is the at least one of the plurality of super-resolution images generated for the input image, and $$x_i^{bi}$$

is an image obtained by zooming in an input image using a bicubic interpolation technique).

6. The device of claim 1, wherein the instructions, when executed by the at least one processor, further cause the device to:

perform multi-scale training, without resolution conversion, on a plurality of super-resolution images having different sizes, respectively, based on a global pooling layer.

7. The device of claim 6, wherein the instructions, when executed by the at least one processor, further cause the device to:

receive the plurality of super-resolution images having different sizes at once in each training epoch, and perform multi-scale training, through back propagation, on the plurality of super-resolution images having different sizes, respectively.

8. The device of claim 6, wherein the instructions, when executed by the at least one processor, further cause the device to:

determine whether the input image is a deepfake based on an $L_{MS}$ loss function, and wherein the $L_{MS}$ loss function is defined as [Equation 4] below;

$$\mathcal{L}_{MS} = \sum_{i=1}^{N} CE(x_i^{bi}, y) + \sum_{i=1}^{N} CE(\hat{x}_i^{sr}, y) \qquad \text{[Equation 4]}$$

(Here, N is the total number of branches i, CE is a cross entropy loss function for binary classification, $$x_i^{bi}$$

is an image obtained by zooming in an input image using a bicubic interpolation technique, $$\hat{x}_i^{sr}$$

is one of the plurality or super-resolution images generated for the input image, and y is a label to distinguish between a deepfake image and a real image).

9. A method of detecting a deepfake, the method comprising:

receiving an input image including a low-quality deepfake video;

enhancing the resolution of the input image through unsupervised super-resolution training;

generating a plurality of super-resolution images having different sizes;

performing multi-scale training, without resolution conversion, on the plurality of super-resolution images having different sizes, respectively;

synthesizing multi-scale training results for the plurality of super-resolution images having different sizes, respectively; and determining whether the input image is a deepfake based on the multi-scale training results.

* * * * *